May 9, 1950 F. N. MARIANI 2,507,312
FRUIT JUICE EXTRACTOR
Filed July 13, 1945 2 Sheets-Sheet 1
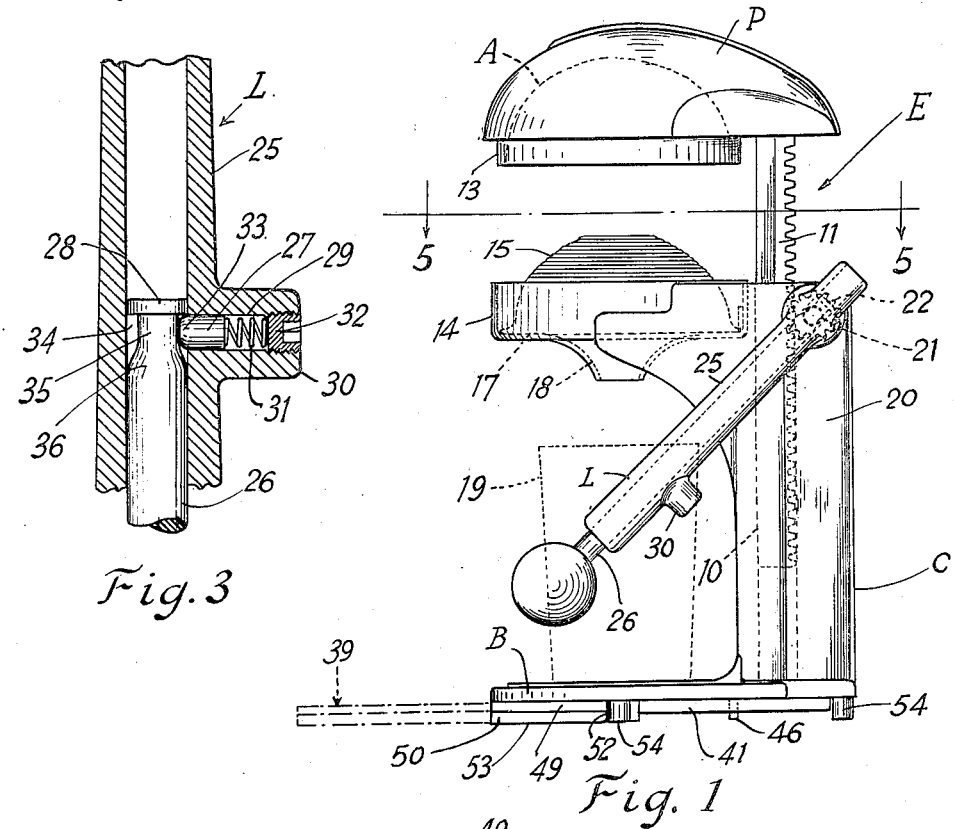
Fig. 3
Fig. 1
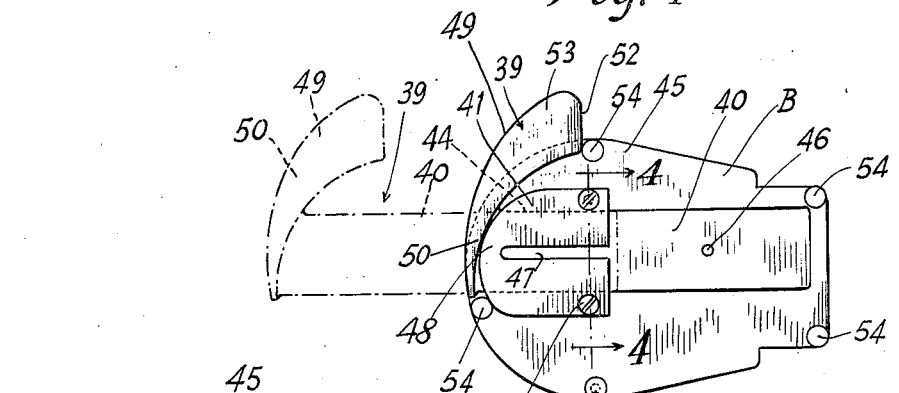
Fig. 2
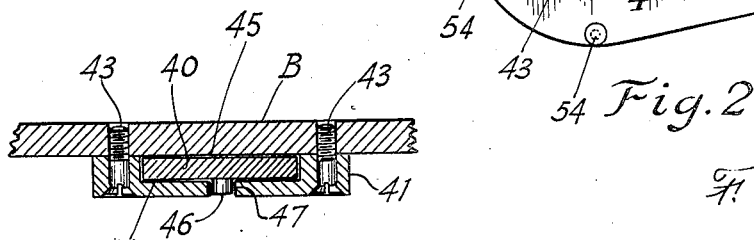
Fig. 4
F. N. Mariani
INVENTOR
BY
Cm Palmer
ATTORNEY May 9, 1950 F. N. MARIANI 2,507,312
FRUIT JUICE EXTRACTOR
Filed July 13, 1945 2 Sheets-Sheet 2

F. N. Mariani
INVENTOR

BY

Palmer
ATTORNEY

Patented May 9, 1950

2,507,312

UNITED STATES PATENT OFFICE 2,507,312

FRUIT JUICE EXTRACTOR

Frank N. Mariani, Washington Heights, N. Y.

Application July 13, 1945, Serial No. 604,826

13 Claims. (Cl. 100—42)

The present invention is directed to an improved device for extracting juices out of compressible foods and specifically is concerned with a fruit juice extractor having a linearly movable pressure applying member adapted to be displaced towards or away from a suitable food sustaining anvil mounted in a juice collecting and draining receptacle. Juice extracting devices of the type alluded to are generally provided with a rotatable control lever for actuating a shaft carrying a pinion which is in mesh with a toothed rack sustaining the pressure applying member. Obviously where the lever is relatively long, less force is required during squeezing operations in that the mechanical advantage has been increased. With such increased mechanical advantage it has been discovered that usually the supporting base for the extracting device is inadequate and unless firmly anchored, there is danger of accidental tilting of the extracting device. Consequently a portable juice extracting device with a relatively longer operating control lever requires an enlarged supporting base to prevent tilting or undesirable tipping of the extracting device but an enlarged supporting base requires more space generally and even for storage or transportation. The present invention has as its primary object to provide a compact and portable juice extracting device wherein the base thereof embodies a balancer or stabilizing means which can be conveniently and quickly extended to compensate for the increased extension of the control lever. Conversely, the invention has as a further object to provide a serviceable and improved juice extracting device wherein the control lever may be easily extended or reduced in length to compensate for the extent of the projection of the stabilizing means or balancer slidably sustained by the base. Another object of the invention resides in the provision of a supporting base having means for rectilinearly guiding a balancing member movable towards or away from an upstanding and rearwardly disposed column for stabilizing the base against tilting. A further object is to provide a yoke for slidably guiding a base balancing member which is adapted to be withdrawn from the base or retracted therein. Another object is realized in providing stop means to limit the withdrawal of the balancing member from the base or the retraction thereof into the base. Another object is to provide a serviceable fruit juice extractor which may be easily operated without heavy exertion on the part of the operator and which when not in use occupies a relatively small space even though embodying means to stabilize the base and means for enlarging or reducing the mechanical advantage of the control lever. Other important objects and functional and structural features of the invention will appear from the following detailed drawings taken in connection with the accompanying drawings wherein:

Fig. 1 is a side view of the fruit juice extractor according to my invention, illustrating in full lines the slidable balancer retracted into the base and in dash and dot lines the balancer is extended or withdrawn from the base.

Fig. 2 is an underneath or bottom view of Fig. 1.

Fig. 3 is a fragmentary and enlarged sectional view of the control lever.

Fig. 4 is a transverse sectional view on the line 4—4 of Fig. 2.

Figure 5:
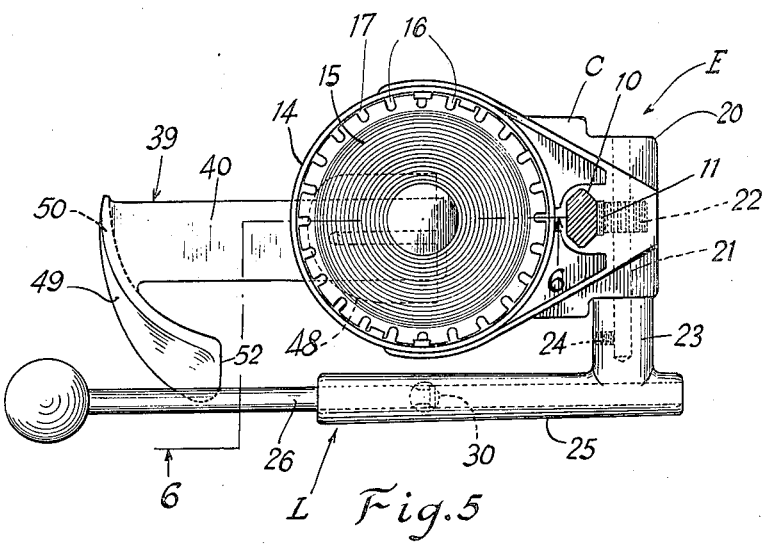
Fig. 5 is a horizontal sectional view on the line 5—5 of Fig. 1.
Figure 6:
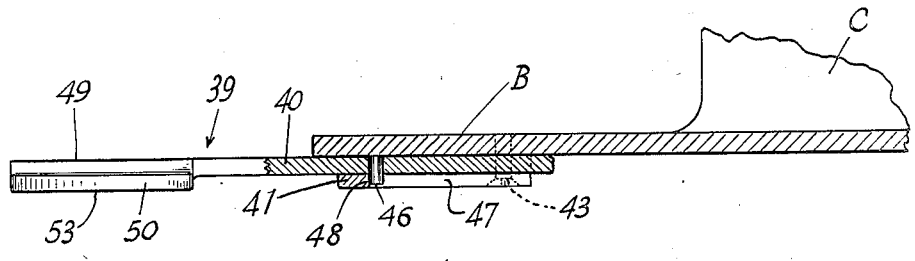
Fig. 6 is a vertical sectional view on the bent plane 6—6 of Fig. 5.
Figure 7:
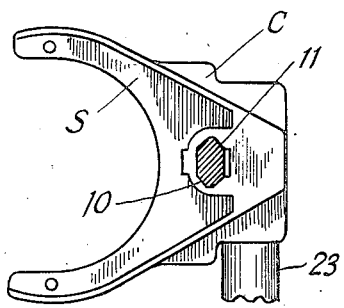
Fig. 7 is a fragmentary view of Fig. 5 with the juice collecting and draining receptacle removed from the column.
Figure 8:
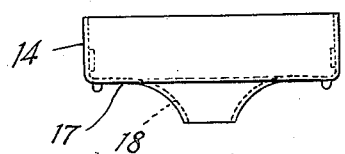
Fig. 8 is a front elevational view of the juice collecting and draining receptacle.

The fruit juice extracting device or extractor is generally designated E having the base B appropriately carrying the standard or column C embodying the vertically arranged opening 10 for slidably guiding the toothed rack 11 fixedly carrying the hood or pressure applying member P provided with the depending annular flange 13 removably receivable in the annular juice collecting and draining dish or receptacle 14 removably and appropriately mounted on the shelf or arcuate flange S extending forwardly from the column C.

Removably associated and mounted in the juice collector 14 but in part extending therefrom is the dome shaped and corrugated or ribbed anvil or fruit support 15 which includes a plurality of radially arranged slots 16 communicating with bottom wall 17 of the juice collector or receptacle 14 having the depending funnel or hollow nipple 18 for directing the juices collected in the receptacle 14 downwardly and outwardly into a suitable tumbler 19 adapted to be mounted on the base B.

The column C has a boss 20 sustaining the rotatable shaft 21 to which is fixed the pinion 22 in mesh with the rack 11. The shaft extends into a bushing 23 and an adjustable set screw 24 is utilized to firmly hold the latter to the shaft. The bushing 23 is a part of the operating control lever generally denoted L comprising a tubular member or housing 25 slidably guiding the handle or rod 26.

By the arrangement disclosed the control lever if rotated or swung actuates the rotatable shaft 21, thus causing the pinion 22 to drive the rack 11, consequently shifting the hood or cap P, that is, the pressure applying member towards the receptacle 14 or away therefrom depending upon the direction of rotation of the control lever.

If the lever be rotated to shift hood P towards the anvil 15, fruit mounted on the latter will be contacted by the arcuate pressure applying surface A which moves towards the anvil and the depending flange 13 is telescopically received in the receptacle 14, thus facilitating drainage of the juices therein.

The mechanical advantage of the lever may be controlled. This of course is accomplished by projecting the handle 26 from its housing or tube 25. Full withdrawal is prevented by the coaction of the tumbler 27 (note Fig. 3) with the stop flange 28. This tumbler is slidably guided in bore 29 of the hollow boss 30 and is held yieldingly against the handle 26 by spring 31 interposed between the adjustable plug 32 and one end of the tumbler which includes a reduced portion 33 adapted to snap into the annular groove 24 defined by the flange 28, the reduced portion 35 and the tapered portion 36 of the handle 26. The spring controlled slidable tumbler consequently automatically interlocks with the handle to prevent its complete withdrawal. However when the slidable handle 26 is only partly extended from its tubular housing, tumbler 27 yieldingly bears against the outside surface of the handle to hold it in a set position against accidental dislodgement.

Where the operating lever is in its least extended position illustrated in Fig. 1, the base at times may be inadequate to prevent tilting of the extracting device where a relatively large force is required on the control lever to completely squeeze the fruit mounted on the anvil. With a relatively large force applied to the control lever by the operator, the base at times is unstable, that is, its rear end tilts upwardly, pivoting on the forward end of the base. Under such circumstances, danger of undesirably tipping the entire extracting device is increased.

By the present invention if the lever be extended, that is, by projecting the handle, a relatively light force is required for completely squeezing the fruit. With the handle extended, however the danger of tilting the extracting device is further enhanced and aggravated. To prevent tilting of the extracting device and to stabilize the base thereof, a balancer broadly designated 39 is provided.

The balancer in fact is a rectangularly shaped bar 40 rectilinearly disposed in a yoke or block 41. Specifically the yoke is attached to the base by adjustable fastening means 43 and includes guide channel 44, the walls of which in cooperation with the undersurface 45 of the base slidably guide bar 40 having the force fitted and depending pin 46 adapted to ride in the longitudinally arranged slot 47 and contact the forward portion 48 of the yoke or guide 41, thus limiting the withdrawal of the balancer 39 from the base.

Integral with the forward end of bar 40 is an arcuate shaped lip arm 49 having a depending rim portion 50 coacting with the front part 48 of yoke 41 to limit the retraction of the balancer 39 into the base. The lip 49 in fact laterally extends beyond the base B even if the balancer is fully retracted and a slight finger thrust applied to wing or terminal 52 will withdraw or project the balancer forwardly of the base. The lip or arm 49 although integral with bar 40 extends below the latter and has its bottom surface 53 flush with the bottoms of the supporting feet 54 fastened to the base B and the column of the extracting device.

In operation, the fruit on the anvil is crushed by the pressure applying member P on rotation of the control lever. Where certain resistance is offered by the fruit or where the operator desires to apply a lighter force, the lever may be quickly extended by withdrawing the handle. Thereafter the balancer 40 may be quickly set to a withdrawn portion in front of the base by actuating the manipulator or lip 49. By this arrangement the mechanical advantage of the extracting device is now multiplied requiring less effort on the part of the operator to carry on with safety against tilting in that the slidable and adjustable balancer stabilizes the base. After completion of the extracting operation the handle and balancer may be readily retracted and thus the extractor takes up less space.

Various changes may be made in details of construction and arrangement of parts without departing from the spirit of the invention or sacrificing any of the advantages thereof inherent therein.

I claim:

1. In a juice extractor, a base, a column carried by said base, a juice collecting and draining receptacle sustained by said column, an anvil mounted in said receptacle, a pressure applying member, driving means for actuating said member towards or away from said anvil, control means comprising a housing for operating said driving means, a handle slidably guided by said housing and adapted to be withdrawn from or retracted into said housing and having a restricted portion, a flange extending from said handle and defining with said restricted portion a groove, spring controlled means cooperating with said handle to resist displacement of the latter relative to said housing, said spring controlled means comprising a slidably guided tumbler for removably interlocking with the wall of said groove, and said flange cooperating with said tumbler to limit the withdrawal of said handle from said housing.

2. In a juice extractor, a base constituting primary supporting means, a column carried by said base, a juice collecting and draining receptacle sustained by said column, an anvil mounted in said receptacle, a pressure applying member, driving means for actuating said member towards or away from said anvil, a control lever for operating said driving means, a bar movably mounted on said base, means carried by said base for guiding said bar for movement towards or away from said column, a manipulatable arm extending laterally of said bar to provide supplementary supporting means for said extractor, and means to limit displacement of said bar relative to said base.

3. In a juice extractor, a base constituting primary supporting means, a column carried by said base, a juice collecting and draining receptacle sustained by said column, an anvil mounted in said receptacle, a pressure applying member, driving means for actuating said member towards or away from said anvil, a control lever above said base for operating said driving means, a bar mounted on said base, means carried by said base for guiding said bar for rectilinear movement towards or away from said column, a manipulatable arm extending laterally of said bar to provide supplementary supporting means for said extractor, and means to limit displacement of said bar relative to said base.

4. In a juice extractor, a base constituting primary supporting means, a column carried by and disposed rearwardly of said base, a juice collecting and draining receptacle sustained by said column, an anvil mounted in said receptacle, a pressure applying member, driving means for actuating said member towards or away from said anvil, a control lever for operating said driving means, a displaceable bar mounted on said base and having a front portion, means carried by said base for slidably guiding said bar for movement thereof rearwardly towards or forwardly away from said column, manipulatable means extending laterally of said front portion to provide supplementary supporting means for said extractor, and means to limit displacement of said bar relative to said base.

5. In a juice extractor, a hollow base constituting primary supporting means, a column carried by and disposed rearwardly of said base, a juice collecting and draining receptacle sustained by said column, an anvil mounted in said receptacle, a pressure applying member, driving means for actuating said member towards or away from said anvil, a control lever for operating said driving means, a displaceable bar mounted within said base and having a front portion, means carried by said base for movably guiding said bar into or out of said base, manipulatable means extending laterally of said front portion to provide supplementary supporting means for said extractor, and means to limit displacement of said bar relative to said base.

6. In a juice extractor, a hollow base constituting primary supporting means, a column carried by and disposed rearwardly of said base, a juice collecting and draining receptacle sustained by said column, an anvil mounted in said receptacle, a pressure applying member, rack and pinion means for actuating said member towards or away from said anvil, a control lever for operating said rack and pinion means, a movable bar within said base and having a front portion disposed outside of said base, means carried by said base for slidably guiding said bar for movement thereof rearwardly towards or forwardly away from said column, manipulatable means extending laterally of said front portion to provide supplementary supporting means for said extractor, and means to limit displacement of said bar relative to said base.

7. In a juice extractor, a base to constitute primary supporting means, a column carried by said base, a juice collecting and draining receptacle sustained by said column, an anvil mounted in said receptacle, a pressure applying member, driving means for actuating said member towards or away from said anvil, a control lever for operating said driving means, stabilizing means comprising a bar on said base, means carried by said base for movably guiding said bar to project the latter beyond or into said base, means on said bar and extending towards a region below said control lever to provide supplementary supporting means for said extractor, and means to limit displacement of said bar relative to said base.

8. In a juice extractor, a base to constitute primary supporting means, a column carried by said base, a juice collecting and draining receptacle sustained by said column, an anvil mounted in said receptacle, a pressure applying member, driving means for actuating said member towards or away from said anvil, a control lever disposed at one side of said column for operating said driving means, stabilizing means comprising a bar on said base, means carried by said base for slidably guiding said bar to project the latter into or away from said base, said bar having means extending towards a region below said control lever and towards said side to provide supplementary supporting means for said extractor, and means to limit displacement of said bar relative to said base.

9. In a juice extractor, a base to constitute primary supporting means, a column carried by said base, a juice collecting and draining receptacle sustained by said column, an anvil mounted in said receptacle, a pressure applying member, driving means for actuating said members towards or away from said anvil, a control lever disposed at one side of said column for operating said driving means, stabilizing means comprising a member on said base, means carried by said base for movably guiding said member to project the latter into or away from said base, said member having means extending towards a region below said control lever and towards said side to provide supplementary supporting means for said extractor, and means to limit displacement of said member relative to said base.

10. In a juice extractor, a hollow base to constitute primary supporting means, a column disposed rearwardly of and carried by said base, a juice collecting and draining receptacle sustained by said column, an anvil mounted in said receptacle, a pressure applying member, driving means for actuating said member towards or away from said anvil, a control lever disposed at one side of said column for operating said driving means, shiftable stabilizing means comprising a bar disposed within said base, means carried by said base for movably guiding said bar into or out of said base, an arm outside of said base and extending from said bar and laterally thereof towards a region below said lever and towards said side to provide supplementary supporting means for said extractor, and means to limit displacement of said bar relative to said base.

11. In a machine for extracting juices from fruit, a hollow base constituting primary supporting means, a column carried by said base, a juice collecting and draining receptacle sustained by said column, an anvil mounted in said receptacle for supporting said fruit, a pressure applying member above said anvil, driving means for actuating said member downwardly towards said anvil to crush said fruit or upwardly away from said anvil to permit removal of said fruit, a control lever for operating said driving means, a handle slidable guided by said control lever to constitute an extension for the latter, a bar disposed in part within said base, means carried by said base for movably guiding said bar into or out of said base, a manipulatable arm disposed outside of said base and extending laterally of said bar to provide supplementary supporting means for said extractor when said handle is withdrawn from said lever, means to limit the displacement of said bar out of said base, and said base having means cooperating with said arm to limit the insertion of said bar into said base.

12. In a machine for extracting juices from fruit, a hollow base constituting primary supporting means, a column carried by said base, a juice collecting and draining receptacle sustained by said column, an anvil mounted in said receptacle for supporting said fruit, a pressure applying member above said anvil, driving means for actuating said member downwardly towards said anvil to crush said fruit or upwardly away from said anvil to permit removal of said fruit, a control lever for operating said driving means, a handle slidably guided by said control lever to constitute an extension for the latter, a bar within said base, guide means carried by and within said base for slidably and rectilinearly guiding said bar into or out of said base, a manipulatable arm normally disposed outside of said base and extending laterally of said bar to provide supplementary supporting means for said extractor when said handle is withdrawn from or retracted into said handle, means to limit the displacement of said bar out of said base, said base having means cooperating with said arm to limit the insertion of said bar into said base, and means to limit the displacement of said handle relative to said lever.

13. In a machine for extracting juices from fruit, a hollow base to constitute primary supporting means, a column carried by said base, a juice collecting and draining receptacle sustained by said column, an anvil mounted in said receptacle for supporting said fruit, a pressure applying member above said anvil, driving means for actuating said member downwardly towards said anvil to crush said fruit or upwardly away from said anvil to permit removal of said fruit, a control lever for operating said driving means, a handle slidably guided by said control lever to constitute an extension for the latter, stabilizing means, means carried by said base for movably guiding said stabilizing means into or out of said base, accessible manipulatable means normally disposed outside of said base and extending laterally of and constituting a part of said stabilizing means to provide supplementary supporting means for said extractor when said handle is withdrawn from said lever, means to limit the displacement of said stabilizing means out of said base, said base having means cooperating with said manipulatable means to limit the insertion of said stabilizing means into said base, and means to limit displacement of said handle relative to said lever.

FRANK N. MARIANI.

REFERENCES CITED

The following references are of record in the file of this patent:

UNITED STATES PATENTS

| Number | Name | Date |
|---|---|---|
| 250,165 | Palmer | Nov. 29, 1881 |
| 891,800 | Enrico | June 23, 1908 |
| 1,172,881 | Dodge | Feb. 22, 1916 |
| 1,562,390 | Trust et al. | Nov. 17, 1925 |
| 1,782,313 | Poehls | Nov. 18, 1930 |
| 1,887,924 | Evans | Nov. 15, 1932 |
| 2,090,913 | Johnson | Aug. 24, 1937 |